United States Patent [19]
Stephenson et al.

[11] Patent Number: 4,586,718
[45] Date of Patent: May 6, 1986

[54] SEALING ASSEMBLY WITH FLOATING GLAND MEANS FOR ROTATABLE SHAFTS

[75] Inventors: Edward J. Stephenson, Collegeville; Raghavachari Kannan, Newtown Square, both of Pa.

[73] Assignee: Crane Co., New York, N.Y.

[21] Appl. No.: 773,342

[22] Filed: Sep. 6, 1985

[51] Int. Cl.⁴ ............................ F16J 15/18; F16J 15/46
[52] U.S. Cl. ........................................ 277/22; 277/27; 277/174; 277/176; 277/177; 277/178
[58] Field of Search ................ 277/3, 22, 27, 173–178

[56] References Cited

U.S. PATENT DOCUMENTS

| | | |
|---|---|---|
| 1,023,525 | 4/1912 | Newlin . |
| 2,167,669 | 8/1939 | Molyneux . |
| 2,243,227 | 5/1941 | Stratton . |
| 2,299,638 | 10/1942 | Marvin . |
| 2,515,410 | 7/1950 | Laas ...................... 277/27 |
| 2,610,874 | 9/1952 | Payne . |
| 2,698,195 | 12/1954 | Pollard . |
| 2,740,648 | 4/1956 | Amblard . |
| 3,093,382 | 6/1963 | Macks .................... 277/27 |
| 3,094,335 | 6/1963 | Shenk ................. 277/174 X |
| 3,606,350 | 9/1971 | Gravelle ................ 277/27 |
| 4,169,603 | 10/1979 | Funk ................... 277/22 X |
| 4,300,778 | 11/1981 | Gagne ................. 277/173 X |
| 4,427,203 | 1/1984 | Escue ................... 277/81 R |

OTHER PUBLICATIONS

Bal-Seal Catalog-pp. 1-8.
Centrifugal Pumps-Stuffing Boxes-Chapter 8, pp. 754-84; Mechanical Seals-chapter 9, pp. 85-91.
Machine Design (Reference Issue "Seals") Jun. 19, 1969, Radial Lip Seals, pp. 5-9; Face Seal, pp. 24-27; Compression Packings, pp. 35-39.

*Primary Examiner*—Robert S. Ward
*Attorney, Agent, or Firm*—Woodcock, Washburn, Kurtz, Mackiewicz & Norris

[57] ABSTRACT

A sealing assembly suited for use in a high temperature and/or high pressure environment with a device such as a pump having a rotatable shaft. The sealing assembly comprises a sealing ring including a body portion having a flange with an end face at one end thereof, the sealing ring being adapted to be mounted on the shaft and rotatable relative thereto. A first gland is loosely mounted on the shaft adjacent the sealing ring, the gland having a first recess to receive the body portion of the sealing ring and the gland having a second recess surrounding the first recess to receive the flange of the sealing ring. The gland is dimensioned relative to the sealing ring whereby the gland is adapted to be loosely mounted on the shaft and the sealing ring for floating action relative thereto subject to the pressure of the environment. A second gland is adapted to be secured to the device, the second gland having a sealing surface adapted to engage the end face of the flange on the sealing ring whereby when the pressure of the environment is directed along the rotatable shaft against the first gland, the first gland and the sealing ring are free to rotate on the rotatable shaft and the flange of the sealing ring is forced against the sealing surface of the second gland under the action of the pressure of the environment to provide a seal therebetween for the rotatable shaft.

7 Claims, 2 Drawing Figures

SEALING ASSEMBLY WITH FLOATING GLAND MEANS FOR ROTATABLE SHAFTS

FIELD OF THE INVENTION

This invention relates to a sealing assembly for rotatable shafts. More particularly, the invention relates to a sealing assembly suitable for use in a high temperature and/or high pressure environment with a device such as a pump having a rotatable shaft.

BACKGROUND OF THE INVENTION

At the present time there are no simple inexpensive dynamic shaft seals available in the pump industry to handle a liquid at high temperature and at high shaft speed. For example, in an application for a pump handling high temperature condensate return to a boiler the environment will involve steam/hot water at 300°+ F. and at shaft speeds as high as 1145 fpm. In the past it has been customary to use stuffing boxes for protecting the pump against leakage at the point where the shaft passes out through the pump casing. A stuffing box usually comprises a cylindrical recess that accommodates a number of rings of packing around the shaft. The packing frequently takes the form of a series of semi-hard rings which are held between the shaft and pump housing and serve as a seal. Some of the disadvantages with packing of this type is that some amount of pumped medium "leaking out" continuously is required for lubrication of the packing. It needs frequent monitoring and lack of lubrication will result in overheating of the seal. When the seal overheats it will subsequently fail and damage the shaft. Also when the seal fails it is not easy to remove and when a new seal is installed an initial break-in period is required. In some installations axial mechanical seals are used to replace conventional stuffing boxes where a fluid must be contained in spite of a substantial pressure head. Mechanical seals generally comprise two precision-machined, highly polished metal faces, (primary seal ring on the rotating shaft and mating ring attached to the housing) which make up the seal. Mechanical seals while they have advantages over conventional stuffing boxes nevertheless they also have disadvantages. For example, mechanical seals are expensive and elaborate hardware and assembly are required especially for high temperature water applications. Installation requires skilled labor and incorrect installation technique will shorten the seal life. Disassembly of the pump is required for removal of the damaged seals and mechanical seals require elaborate cooling arrangements for high temperature applications. Also, abrasive particles in the pumped medium or in the cooling water will damage the polished faces and result in seal failure. Another type of seal for rotating shaft applications is the radial lip-type seal. Lip seals generally comprise a resilient polymer, molded with a lip, held between the shaft and the pump housing. The lip rides against the shaft and the pressure of the medium being pumped imparts a sealing force on the lip. Lip seals have the disadvantage that they are designed for low temperature applications and not for steam applications at high shaft speed. Lip seals require lubrication between the lip and the riding surface and the lubrication is normally provided by the medium itself. Lip seals also require fine machining of the shaft diameter and housing internal dimensions and also require closely maintained tolerances in the manufacture of the components that hold the seal.

OBJECTS OF THE INVENTION

It is a primary object of the invention to provide an improved sealing assembly for use in a high temperature and/or high pressure environment with a device having a high speed rotatable shaft.

It is a further object of the invention to provide a sealing assembly for a pump shaft which is effective to seal steam/hot water at temperatures at least as high as 300°+ F. and at shaft speeds at least as high as 1145 fpm.

It is a further object of the invention to provide a sealing assembly for a pump which is inexpensive and the assembly and disassembly of the seal can be accomplished with unskilled labor and without disassembling the pump housing. The sealing assembly of the present invention will not score or damage the shaft and the tolerances and finishes used in the sealing assembly are easily attainable in an ordinary machine shop with no supercritical tolerance and finishes being required.

SUMMARY OF THE INVENTION

The above needs of the art and objects of the invention are satisfied by the sealing assembly of the present invention which is particularly suited for use in a high temperature and/or high pressure environment with a device such as a pump having a high speed rotatable shaft. Such a sealing assembly comprises a sealing ring comprising a body portion having a flange with an end face at one end thereof, the sealing ring being adapted to be mounted on the rotatable shaft. Gland means is provided having an opening generally conforming to the rotatable shaft, the opening in the gland means being larger in diameter than the diameter of the shaft to permit the gland means to be loosely mounted on the shaft adjacent the sealing ring. The gland means has a first recess surrounding the opening with dimensions larger than the opening to receive the body portion of the sealing ring, the diameter of the first recess being greater than the diameter of the body portion of the sealing ring. The gland means also has a second recess surrounding the first recess to receive the flange of the sealing ring, the second recess having a depth less than the thickness of the flange and a diameter greater than the diameter of the flange whereby the gland means is adapted to be loosely mounted on the shaft and the sealing ring for floating action relative thereto subject to the pressure of the environment. The sealing assembly also includes second gland means adapted to be secured to the device and having an opening generally conforming to the rotatable shaft, the second gland means having a sealing surface surrounding the opening in the second gland means and adapted to engage the end face of the flange on the sealing ring, whereby when the pressure of the environment is directed along the rotatable shaft against the first-named gland means, the first-named gland means and the sealing ring are free to rotate with respect to the sealing surface and the rotatable shaft, and the flange of the sealing ring is forced against the sealing surface of the second gland means under the action of the high pressure environment to provide a seal therebetween for the rotatable shaft. In a preferred embodiment for a high temperature environment means are provided for cooling the sealing ring which comprises a housing having inlet and outlet means for a cooling medium, the housing being mounted in surrounding relation with respect to the second gland means and a cooling medium is introduced into the housing and against the second gland means to cool the sealing ring. Also in a preferred embodiment of the invention, the second gland means comprises a gland nut having threads thereon for engagement with mating threads on the device, the threads on the second gland means being opposite to the direction of rotation of the rotatable shaft.

BRIEF DESCRIPTION OF THE DRAWINGS

The invention will be better understood if reference is made to the accompanying drawings, in which.

DESCRIPTION OF THE PREFERRED EMBODIMENT

Figure 1:
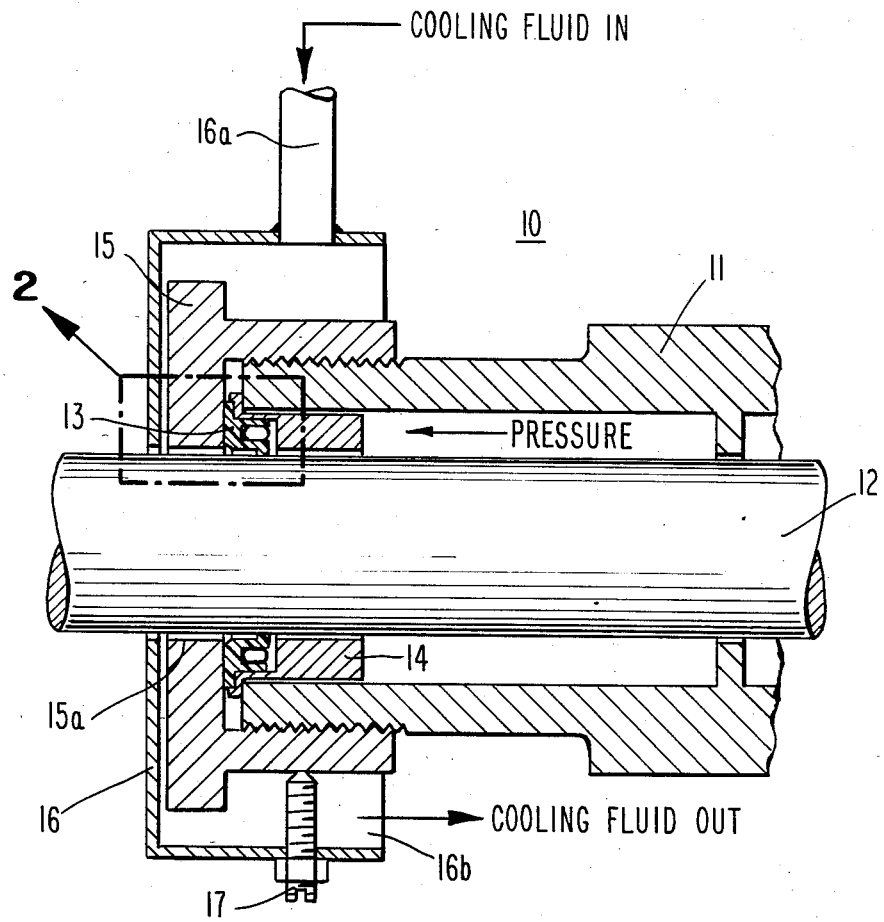
FIG. 1 is a vertical sectional view of a sealing assembly embodying the present invention.
Figure 2:
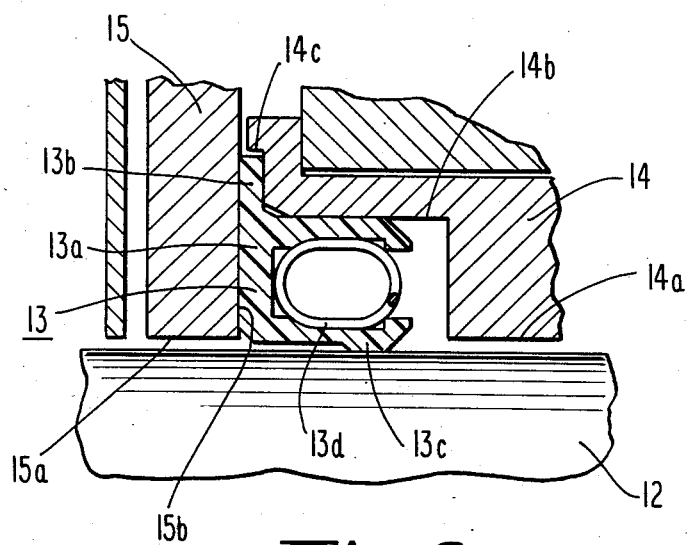
FIG. 2 is a fractional view on enlarged scale of a portion of the sealing assembly shown in FIG. 1.

Referring to the drawing, reference number 10 designates generally a sealing assembly embodying the present invention. The preferred embodiment illustrated in FIG. 1 has been shown in connection with a pump application having a pump casing 11 and a rotatable shaft 12. A sealing ring 13 having a body portion 13a and a flange 13b with an end face at one end thereof is adapted to be mounted on the rotatable shaft 12. The portion 13c of the sealing ring 13 is pressed against the shaft 12 by a coiled spring 13d. The gland 14 having an opening 14a generally conforming to the rotatable shaft but larger in diameter than the diameter of the shaft is provided to permit the gland 14 to be loosely mounted on the shaft adjacent the sealing ring 13. The gland 14 has a first recess 14b surrounding the opening 14a with dimensions larger than the opening to receive the body portion 13a of the sealing ring 13. The gland 14 has a second recess 14c surrounding the first recess 14b to loosely receive the flange 13b of the sealing ring 13. The second recess 14c has a depth less than the thickness of the flange 13b and a diameter greater than the diameter of the flange 13b whereby the gland 14 is adapted to be loosely mounted on the shaft 12 and the sealing ring 13 for floating action relative thereto when subject to the high pressure environment of the pump. A second gland means in the form of a gland nut 15 is adapted to be secured to the pump casing 11 and has an opening 15a therethrough generally conforming to the rotatable shaft 12. The gland nut 15 has a sealing surface 15b surrounding the opening 15a which is adapted to engage the end face of the flange 13b on the sealing ring 13. Thus when the high pressure environment is directed along the rotatable shaft 12 against the floating gland 14 as indicated by the arrow in FIG. 1, the floating gland 14 and the sealing ring 13 are free to rotate with respect to the rotatable shaft 12 and the flange 13b of the sealing ring 13 is forced against the sealing surface 15b of the gland nut 15 under the action of the pressure environment to provide a seal therebetween for the rotatable shaft 12.

In high temperature applications where flashing steam is encountered a cooling arrangement is provided for the sealing ring. In such an application means for cooling the sealing ring may be constructed in accordance with the embodiment illustrated in FIG. 1 wherein there is provided a housing 16 having an inlet means 16a and an outlet means 16b for the cooling medium. The housing 16 is adapted to be mounted in surrounding relation with respect to the gland nut 15 as by a plurality of circumferentially spaced set-screws 17 which maintain the housing 16 in spaced relation to the gland nut 15. As may be seen in FIG. 1 a cooling medium is introduced into the housing 16 and against the gland nut 15 to cool the sealing ring 13. Where the cooling medium comprises water the housing 16 is in the form of a water jacket mounted on the gland nut 15 and spaced therefrom so that when cooling water is introduced into the water jacket, the cooling water passes around the exterior of the gland nut 15 and is discharged through the cooling water outlet 16b in the jacket. As may be seen in FIG. 1 the gland nut 15 is provided with threads for engagement with mating threads on the pump casing 11. The threads on the gland nut 15 are of opposite direction to the direction of rotation of the rotatable shaft 12. This prevents the gland nut 15 from being loosened during operation of the pump.

In an experimental installation of the present invention the sealing assembly was installed in a pump handling high temperature condensate return to a boiler. In a severe environment of flashing steam at 300°+ F. and at a shaft speed of 1145 fpm, the seal showed no significant physical wear even after 900 hrs. continuous use. The first 200 hrs. were accumulated by running the test pump 8 hrs. continuously per day and the final 700 hrs. were accumulated by running the test pump continuously for 24 hrs. per day. The sealing ring part number U-R2006-323-GFP as purchased from Bal Seal Engineering Company and was a light spring loaded minimum duty flange seal of the type illustrated in the drawing. The body portion of the sealing ring was constructed from a composition of graphite fiber reinforced PTFE. Examples of Bal Seal Flange Seals are described and illustrated in the Bal Seal Engineering Catalog entitled "Bal-Seal Flange Seals". Flange Bal Seals are designed and recommended by the manufacturer to be clamped firmly into the housing to reduce movement of the seal with the shaft. This is contrary to applicant's sealing assembly where the sealing ring is not held stationary but is free to turn with or about the shaft. This is contrary to the intended design of the manufacturer where the rubbing surface between the shaft and the seal on the inside diameter of the sealing ring provides the sealing arrangement. In applicant's sealing assembly the rubbing surface is between the inside end surface 15b of the gland nut 15 and the large flat surface including the lip 13b at the rear of the sealing ring 13.

While a preferred embodiment of this invention has been described and illustrated, it is to be understood that other modifications thereof may be made within the scope of the appended claims.

What is claimed is:

1. A sealing assembly suited for use in a high temperature and/or high pressure environment with a device having a rotatable shaft, comprising:

a sealing ring comprising a body portion having a flange with an end face at one end thereof, said sealing ring being adapted to be mounted on the rotatable shaft and rotatable relative thereto, gland means loosely mounted on the shaft adjacent said sealing ring, said gland means having a first recess to receive said body portion of said sealing ring, said gland means having a second recess surrounding said first recess to receive said flange of said sealing ring, said gland means being dimensioned relative to said sealing ring whereby said gland means is adapted to be loosely mounted on the shaft and said sealing ring for floating action relative thereto subject to the pressure of the environment, and second gland means adapted to be secured to the device, said second gland means having a sealing surface adapted to engage said end face of said flange on said sealing ring, whereby when the pressure of the environment is directed along the rotatable shaft against said first-named gland means, said first-named gland means and said sealing ring are free to rotate on said rotatable shaft, and said flange of said sealing ring is forced against said sealing surface of said second gland means under the action of the pressure of the environment to provide a seal therebetween for the rotatable shaft.

2. A sealing assembly according to claim 1 wherein said second gland means comprises a gland nut having threads thereon for engagement with mating threads on the device, said threads on said second gland means being opposite to the direction of rotation of the rotatable shaft.

3. A sealing assembly according to claim 1 wherein said sealing ring includes spring loading means for maintaining said body portion in contact with the rotatable shaft.

4. A sealing assembly according to claim 1 including means for cooling said sealing ring.

5. A sealing assembly according to claim 4 wherein said means for cooling said sealing ring comprises a housing having inlet and outlet means for a cooling medium, means for mounting said housing in surrounding relation with respect to said second gland means and means for introducing a cooling medium into said housing and against said second gland means to cool said sealing ring.

6. A sealing assembly according to claim 5 wherein the cooling medium is water and said housing comprises a water jacket mounted on said second gland means and spaced therefrom so that when cooling water is introduced into said water jacket the cooling water passes around the exterior of said second gland means and is discharged through the cooling water outlet in said jacket.

7. A sealing assembly suited for use in a high temperature and/or high pressure environment with a device having a rotatable shaft, comprising:

a sealing ring comprising a body portion having a flange with an end face at one end thereof, said sealing ring being adapted to be freely mounted on the rotatable shaft, gland means having an opening generally conforming to the rotatable shaft, said opening in said gland means being larger in diameter than the diameter of the shaft to permit said gland means to be loosely mounted on the shaft adjacent said sealing ring, said gland means having a first recess surrounding said opening with dimensions larger than said opening to receive said body portion of said sealing ring, the diameter of said first recess being greater than the diameter of said body portion of said sealing ring, said gland means having a second recess surrounding said first recess to receive said flange of said sealing ring, said second recess having a depth less than the thickness of said flange whereby said gland means is adapted to be loosely mounted on the shaft and said sealing ring for floating action relative thereto subject to the high pressure environment, and second gland means adapted to be secured to the device and having an opening generally conforming to the rotatable shaft, said second gland means having a sealing surface surrounding said opening in said second gland means and adapted to engage said end face of said flange on said sealing ring, whereby when the high pressure environment is directed along the rotatable shaft against said first-named gland means, said first-named gland means and said sealing ring are free to rotate on said rotatable shaft, and said flange of said sealing ring is forced against said sealing surface of said second gland means under the action of the high pressure environment to provide a seal therebetween for the rotatable shaft.

* * * * *